United States Patent [19]

Fukatsu et al.

[11] Patent Number: 4,914,457
[45] Date of Patent: Apr. 3, 1990

[54] ELECTROSTATIC LATENT IMAGE FORMING APPARATUS

[75] Inventors: Takeo Fukatsu, Kyoto; Kazuyuki Gotoh, Osaka; Masaru Takeuchi, Osaka; Kenichiro Wakizaka, Osaka; Kazuhiko Honma, Osaka; Shoichi Nakano, Osaka; Yukinori Kuwano, Osaka, all of Japan

[73] Assignee: Sanyo Electric Co., Ltd., Osaka, Japan

[21] Appl. No.: 168,170

[22] Filed: Mar. 15, 1988

[30] Foreign Application Priority Data

Mar. 16, 1987 [JP] Japan ................................. 62-60341

[51] Int. Cl.⁴ ............................................ G01D 15/06
[52] U.S. Cl. ...................................... 346/155; 346/160
[58] Field of Search ................... 346/153.1, 155, 159, 346/160; 250/423 P

[56] References Cited

U.S. PATENT DOCUMENTS

| 3,323,131 | 5/1967 | MacGriff | 346/155 |
| 3,518,698 | 6/1970 | Kazan et al. | 346/153.1 |
| 3,653,063 | 3/1972 | Miyazaki | 346/159 |
| 3,747,119 | 7/1973 | Matkan | 346/160 X |
| 4,591,885 | 5/1986 | Day et al. | 346/159 |

FOREIGN PATENT DOCUMENTS

1596188  8/1981  United Kingdom.
2164000  3/1986  United Kingdom.

Primary Examiner—Fred L. Braun
Attorney, Agent, or Firm—Darby & Darby

[57] ABSTRACT

An electrostatic latent image forming apparatus includes a dielectric drum (10) a surface of which is uniformly charged in a predetermined polarity by a charging corotron (16). A recording head (18) includes a transparent base plate (30), a transparent electrode (32) and a photoconductive layer (34) composed of an amorphous silicon are formed on the transparent base plate in this order. A plurality of discharging electrodes (36) are formed on the photoconductive layer. A bias voltage (46) having a reverse polarity of the charged polarity being charging by the charging corotron is applied. When a light signal in accordance with an image to be formed is entered on the back surface of the transparent base plate, carriers, that is, holes and electrons are generated in the photoconductive layer, the carrier having the same polarity as the bias voltage is discharged onto the dielectric drum through the discharging electrodes. Electric charges are removed or reduced at a portion on the dielectric drum where such discharge occurs, and therefore an electrostatic latent image in accordance with the light signal being entered is formed on the dielectric drum.

50 Claims, 6 Drawing Sheets

ELECTROSTATIC LATENT IMAGE FORMING APPARATUS

BACKGROUND OF THE INVENTION

1. Field of the Invention

The present invention relates to an electrostatic latent image forming apparatus. More specifically, the present invention relates to an electrostatic latent image forming apparatus in which an electrostatic latent image is formed on a dielectric film by partially applying electric charges onto the same or by partially removing electric charges from a dielectric film being uniformly charged in advance.

2. Description of the Prior Art

As this kind of an electrostatic latent image forming apparatus, typically, an apparatus using a multi-styluses head is known. In one example of such an apparatus using the multi-styluses head, the dielectric drum is uniformly charged by a charging corotron, and a pulse voltage having a reverse polarity of the charged polarity is applied to the multi-styluses head which is held at a distance of 10 $\mu$m through 20 $\mu$m from a surface of the dielectric drum to make desired styluses take place discharge. By partially removing or reducing the electric charges being charged on the dielectric drum by means of the discharge of the styluses, an electrostatic latent image is formed on the dielectric drum.

In the apparatus using such a multi-styluses head, it is difficult to minimize the size of the apparatus and to lower manufacturing cost thereof. Furthermore, there is a problem that it needs MOSFET having a high withstand voltage to apply a high voltage pulse to the multi-styluses head.

By contrast, an electrostatic latent image forming apparatus not using the multi-styluses head is disclosed in, for example, Japanese Patent Laying-Open No. 58-207058 laid open on Dec. 2, 1983. In this secondary prior art, a photoconductive layer is formed on a glass base plate via a transparent electrode, and a light switch array which is arranged closely to a surface of a dielectric drum and a light switch driving means for applying a light signal in accordance with an image signal to the light switch array are provided. By making discharge between the dielectric drum and the light switch array, an electrostatic latent image in accordance with the image signal is formed on the surface of the dielectric drum. The secondary prior art is effective to minimize the size of the apparatus or to reduce the cost since the same does not use the above-described multi-styluses head, but the following problem cannot be solved.

In the case where a photoconductive material is caused to make a switching operation by impinging a light thereto so as to give a photo-conductivity to the same, in accordance with a general characteristic of a light, the light is strongly absorbed at a surface side portion of the photoconductive layer where the light is impinged, and the amount of light is decreased at a portion of the dielectric drum side where discharge takes place, and therefore the photo-conductivity of that portion is decreased. Accordingly, in the photoconductive layer, a resistance is gradually increased from the light impinged side to the dielectric drum side. In a portion where the resistance of the photoconductive layer is high, electric charges able to move a direction in parallel with the surface of the photoconductive layer, therefore an area of a spot-like light signal is gradually expanded to the dielectric drum side in the photoconductive layer, and therefore unevenness of density of the electric charges being discharged takes place. Accordingly, quality of the electrostatic latent image as formed, especially resolution thereof is decreased.

SUMMARY OF THE INVENTION

Therefore, a principal object of the present invention is to provide a novel electrostatic latent image forming apparatus.

Another object of the present invention is to provide an electrostatic latent image forming apparatus which does not use a multi-styluses head so as to be able to miniaturize the size thereof and lower the cost thereof.

Another object of the present invention is to provide an electrostatic latent image forming apparatus in which resolution cannot be decreased.

Still another object of the present invention is to provide a novel recording head which is effectively utilized in an electrostatic latent image forming apparatus.

Another object of the present invention is to provide a recording head in which resolution cannot be decreased.

The other object of the present invention is to provide a recording head having discharging electrodes which are made to discharge in response to a light signal.

A recording head in accordance with the present invention comprises a transparent base plate composed of a light-transmissive material. A transparent electrode is formed on one main surface of the transparent base plate, and a photoconductive layer is formed on the transparent electrode. On the photoconductive layer, there are formed discharging electrodes. A predetermined bias voltage may be applied to the transparent electrode. A light signal is impinged or entered from the other main surface of the transparent base plate by an optical system.

When the light signal is impinged or entered to the transparent base plate by the optical system, a light responsively enters to the photoconductive layer through the transparent electrode. Accordingly, carriers, that is, holes and electrons are generated within the photoconductive layer. The carrier having the same polarity as the bias voltage being applied to the transparent electrode is discharged onto a dielectric film such as a dielectric drum, dielectric belt, recording paper or the like through the discharging electrodes formed on the photoconductive layer. By such a discharge, electric charges are partially applied on the dielectric film or partially removed from the dielectric film, whereby an electrostatic latent image in accordance with the light signal impinged or entered by the optical system is formed on the dielectric film.

In the case where such a recording head is applied to an electrostatic latent image forming apparatus, the recording head is arranged so that the discharging electrodes are set apart from the dielectric film with a predetermined air-gap. In the electrostatic latent image forming apparatus in which the dielectric film is uniformly charged in advance and thereafter, the electric charges being charged are partially removed by discharge of the discharging electrodes of the recording head, at the upstream side of the recording head in a direction of a relative movement of the dielectric film and the recording head, charging means, for example, a charging corotron is arranged to uniformly charge the dielectric film. In the electrostatic latent image forming apparatus in which the electric charges are partially applied on the dielectric film by discharge of the discharging electrodes of the recording head, it is not necessary to provide such a charging means.

In accordance with the present invention, since the multi-styluses head is not used, likewise the secondary prior art, it is effective to miniaturize the size thereof or to lower the cost thereof.

Furthermore, in accordance with the present invention, since the discharging electrodes are formed on the photoconductive layer of the recording head, electrostatic capacitance can be formed between the respective discharging electrodes and the transparent electrode by the photoconductive layer. The electrostatic capacitance defines a path of the carrier in the photoconductive layer, and therefore the carrier is prevented from being diffused in the photoconductive layer. Therefore, unevenness of density of the electric charges as discharged between the discharging electrodes and the dielectric film can be prevented, and therefore resolution is not decreased. In addition, the electrostatic capacitance has a function that causes concentration of an electric field, therefore it is possible to lower a discharge starting voltage between the discharging electrodes and the dielectric film. Therefore, a distance of the air-gap between the dielectric film and the discharging electrodes may be decided relatively rough if the bias voltage is a constant. This is conducted to a simplicity in manufacturing. In reverse, if the dielectric film and the discharging electrodes can be positioned with a precise air-gap, it is possible to reduce a magnitude of the bias voltage to be applied to the transparent electrode. In this case, it is possible to reduce injection of the electric charge from the bias voltage source in darkened state of the photoconductive layer, that is, a dark current.

If a non-crystalline semiconductor such as an amorphous silicon is used as the photoconductive layer, in combination with the discharging electrodes, a fine patterning technique which has been established in a field of semiconductor device can be utilized, and therefore difficulty in manufacturing thereof can be avoided, and therefore a future development is very expectable.

The above described objects and other objects, features, aspects and advantages of the present invention will become more apparent from the following detailed description of the present invention when taken in conjunction with the accompanying drawings.

DETAIL DESCRIPTION OF THE PREFERRED EMBODIMENTS

Figure 1:
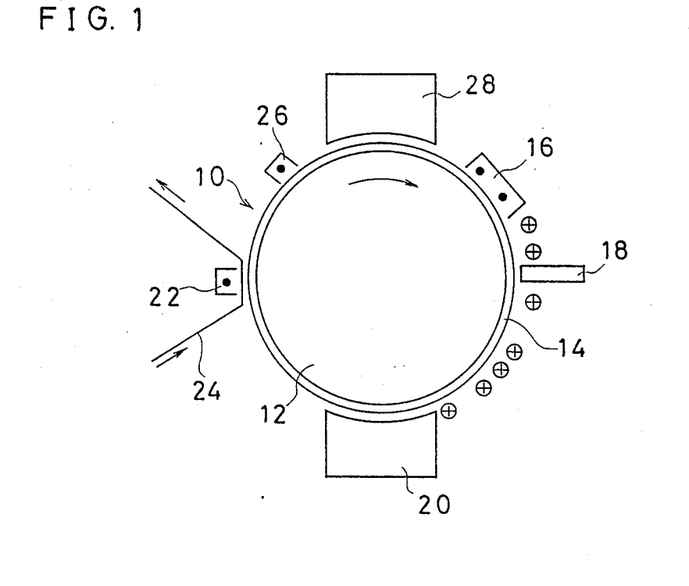
FIG. 1 is an illustrative view showing one example of an electrostatic latent image forming apparatus.

In reference to FIG. 1, a dielectric drum 10 includes a cylindrical substrate 12 which is made of electrical conductive material such as an aluminum. On an outer surface of the substrate 12, a dielectric film 14 having a film thickness of approximately 20 $\mu$m, for example is formed by coating a dielectric material. Any dielectric material may be utilized as the material of the dielectric film 14.

In addition, in different from the embodiment shown, the dielectric film 14 may be formed as an endless belt having a plan or concavo-convex surface.

In the near of the outer surface of the dielectric drum 10, that is, the dielectric film 14, a charging corotron 16 is arranged. The charging corotron 16 uniformly charges the dielectric film 14 in a predetermined polarity, for example, positive or plus (+). A latent image forming device or recording head 18 is formed at the downstream side of the charging corotron 16 in a rotational direction of the dielectric drum 10. When the dielectric film 14 which has been uniformly charged at +500 V by the charging corotron 16 is brought beneath the latent image forming device or recording head 18 in response to a rotation of the dielectric drum 10, electric charges on the dielectric film 14 are selectively and partially removed by the latent image forming device or recording head 18 so that an electrostatic latent image is formed on the dielectric film 14.

The electrostatic latent image thus formed is developed as a toner image by a toner developing device 20, and the toner image is transferred onto a paper 24 by a transferring corotron 22. Then, remaining electric charges on the dielectric drum 10, that is, the dielectric film 14 are removed by a discharging corotron 26. On the other hand, the toner which was not transferred onto the paper 24 and being left on the dielectric drum 10 is removed by a cleaning device 28.

Figure 2:
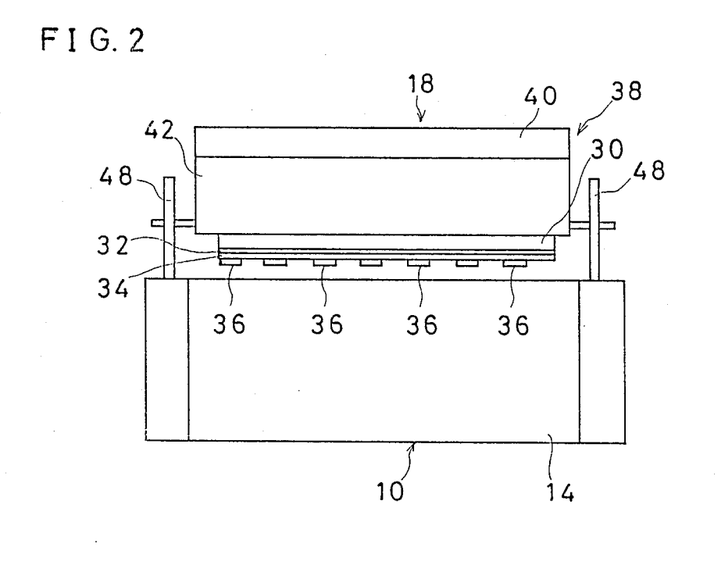
FIG. 2 and FIG. 3 are illustrative views showing one embodiment in accordance with the present invention.
Figure 3:
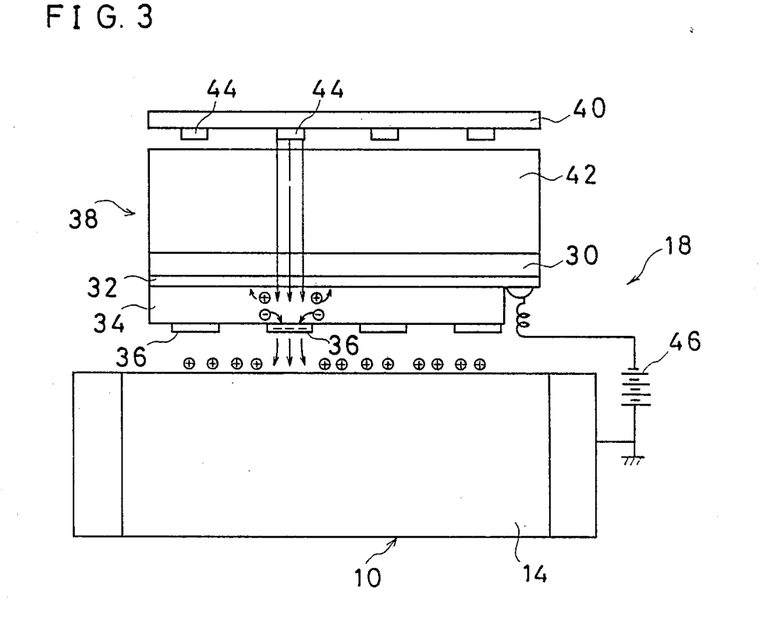

In reference to FIG. 2 and FIG. 3 where a recording head 18 is specifically shown in detail, the recording head 18 includes a transparent base plate 30 composed of a light-transmissive material such as a glass, which has main surfaces in parallel with an axial line of the dielectric drum 10. On one main surface of the transparent base plate 30 facing to the dielectric drum 10, there is formed a transparent electrode 32 composed of ITO- (Indium Tin Oxide), for example, on which a photoconductive layer 34 is further formed. On a surface of the photoconductive layer 34, a number of dotlike discharging electrodes 36, 36—are arranged and formed in accordance with necessary resolution. The discharging electrodes 36 may be formed any electrical conductive material, for example, Al, Cr, Ti or the like and may be transparent or opaque.

As a material of the photoconductive layer 34, an amorphous semiconductor such as amorphous silicon, amorphous germanium, amorphous selenium or the like; a crystalline semiconductor including single crystalline or poly-crystalline semiconductor such as a silicon, germanium or the like; an amorphous compound semiconductor such as Cds, GaAs, GaP or the like; or an organic photoconductive material such as azoichic pigment, hydrazone or the like can be utilized. However, in this embodiment shown, an amorphous silicon is utilized. In taking into consideration a mechanical strength and a withstand voltage, a thickness of approximately 0.5 μm through 80 μm is practically suitable for the photoconductive layer 34 composed of an amorphous silicon. The reason is that the withstand voltage and mechanical strength decrease if the thickness is too thin, and if too thick, a characteristic as a light switch is decreased.

In addition, in this embodiment, in an amorphous silicon forming the photoconductive layer 34, hydrogen or halogen element of approximately 5 atomic % through 40 atomic % is doped. Hydrogen and halogen element is added to reduce defect of atomic bond in an amorphous silicon, that is, the photoconductive layer 34, and halogen element is effective to increase a thermal stability.

On the other main surface of the transparent base plate 30 opposing to the dielectric drum 10, there are provided an LED array 40 and a short-focal distance lens array 42 which constitute an optical system 38. As shown by a dotted-line in FIG. 4, the LED array 40 includes a number of LED elements 44 which correspond to a number of the discharging electrodes 36 formed on the photoconductive layer 34. By partially and selectively lightened desired LED elements out of a number of the LED elements 44 of the LED array so that the light signal may be impinged or entered to the photoconductive layer 34, the discharging electrodes 36 corresponding to the lightened LED elements are caused to discharge. In this embodiment shown, the discharging electrodes 36 and the LED elements 44 are respectively arranged in a linear line in the axial direction of the dielectric drum 10; however, arrangements of the discharging electrodes 36 and the LED elements 44 is not limited by such an arrangement.

Furthermore, a bias voltage from a voltage source 46 is applied to the transparent electrode 32. In the embodiment shown, since the dielectric film 14 is plus-charged by the charging corotron 16 (FIG. 1), the polarity of the bias voltage of the voltage source 46 is the reverse polarity of the charged polarity, that is, negative or minus (−). The discharge by the discharging electrodes 36 between the dielectric drum 10 is encouraged by the bias voltage having the reverse polarity and being applied to the transparent electrode 32.

In operation, the dielectric drum 10 is rotated by a driving source (not shown) and the charging corotron 16 (FIG. 1) is enabled. Responsively, the dielectric film 14 of the dielectric drum 10 is uniformly charged. On the other hand, when an electrical signal in accordance with an electrostatic latent image to be formed is applied from a signal source (not shown) to the LED array 40 constituting the optical system 38, a portion of the LED elements 44 of the LED array 40 is selectively and partially lightened. The light from the LED elements 44 is focused by the short-focal distance lens array 42 and impinged or entered to the photoconductive layer 34 through the transparent base plate 30 and the transparent electrode 32. Thus, a light image or light signal is focused on the upper surface of the photoconductive layer 34.

When the light signal is impinged or entered to the photoconductive layer 34, electrons and holes are responsibly generated interior of the photoconductive layer 34, as shown in FIG. 3. The holes are drawn by the negative bias voltage being applied to the transparent electrode 32 and moved toward the transparent electrode 32, while the electrons are repelled by the negative bias voltage and moved toward the discharging electrodes 36. Accordingly, the electrons existing on the discharging electrodes 36 and the plus (+) electric charges being charged on the dielectric film 14 are coupled, whereby the discharge takes place between the discharging electrodes 36 and the dielectric film 14. By discharge by means of the discharging electrodes 36, the electric charges on the dielectric film 14 are selectively and partially removed or reduced so that the electrostatic latent image is formed on the dielectric film 14.

Figure 4:
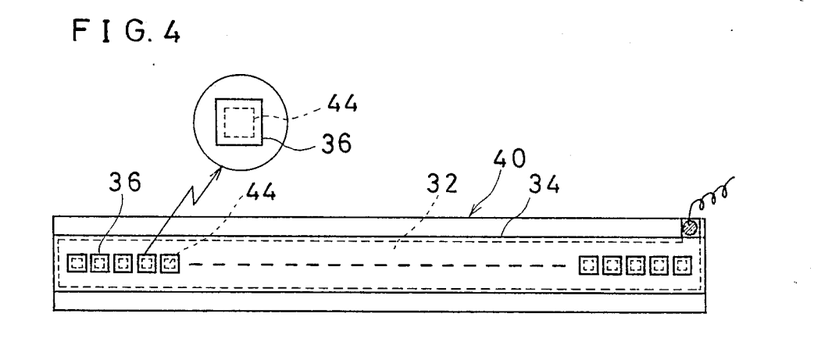
FIG. 4 is an illustrative plane view showing a relationship between LED elements of an LED array and discharging electrodes used in the embodiment.

In this time, as easily presumed from FIG. 4, the light signal from the LED elements 44 does not impinge or enter to a portion of the photoconductive layer 34 other than the discharging electrodes 36, and therefore the above-described carriers, that is, the electrons and the holes are not generated in that portion, thus the above-described discharge can not occur on the area other than the discharging electrodes 36.

Discharge at such an undesired portion is more securely prevented by the discharging electrodes 36. More specifically, electrostatic capacitance can be formed by the photoconductive layer 34 between the respective discharging electrodes 36 and the transparent electrode 32. A path of the carrier is defined in the photoconductive layer 34 by the electrostatic capacitance, resulting in concentration of the electric charges. Therefore, the carriers cannot be diffused out of the portion where the electrostatic capacitance is formed, thus unevenness of the density of the electric charges being discharged can be prevented. Such a specific effect by the discharging electrodes 36 can not be expected in the previously cited Japanese Patent Application Laid-Open No. 58-207058 which has no discharging electrodes.

In addition, as shown in FIG. 2, spacer rollers 48 are attached to the transparent base plate 30 or the short-focal distance lens array 42. The air-gap between the discharging electrodes 36 and the dielectric film 14 is constantly maintained within a certain range of approximately 5 μm through 50 μm, for example, even if the dielectric drum 10 is rotated.

Figure 5:
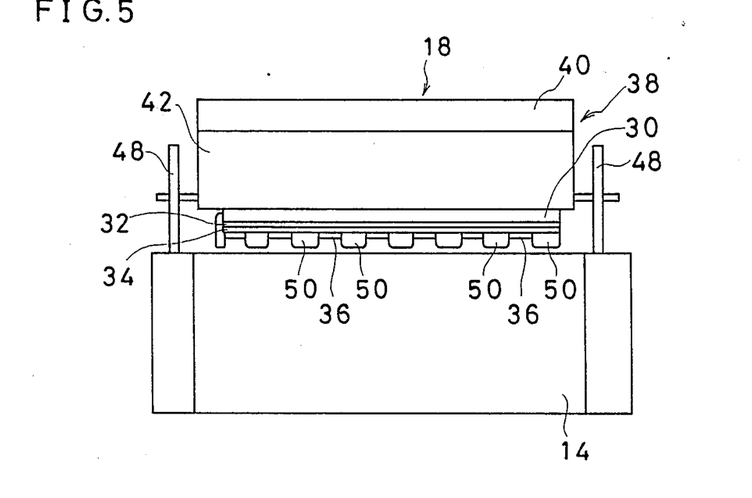
FIG. 5 is an illustrative view showing another embodiment in accordance with the present invention.

In reference to FIG. 5, in the embodiment shown, an insulation covering layer 50 is formed on the photoconductive layer 34 at the portions other than the discharging electrodes 36, which is composed of, for example, a crystalline material such as $Si_3N_4$, SiC or the like; an amorphous material such as $a-Si_xN_{(1-x)}$, a-C, $a-Si_xC_{(1-x)}$ or the like; or an organic insulating material such as an epoxy resin or the like. The covering layer 50 functions passivation for the surface of the photoconductive layer 34. More specifically, side edges of the discharging electrodes 36 are covered by the covering layer 50, and therefore undesired discharge at the area other than the discharging electrodes 36 is more securely prevented.

Figure 6:
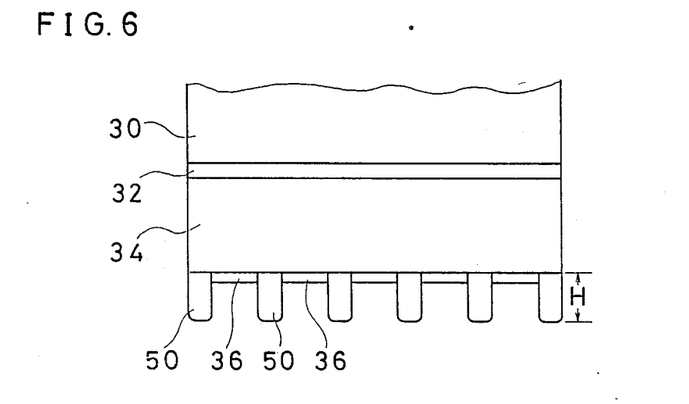
FIG. 6 is an illustrative view showing a major portion of a modification of FIG. 5 embodiment.

In addition, in FIG. 5 embodiment, as shown in FIG. 6, if a height H of the covering layer 50 is made higher than the thickness of the discharging electrodes 36 and decided to a predetermined height, the aforementioned spacer rollers 48 (FIG. 2 or FIG. 5) can be omitted. More specifically, by making the tip end of the covering layer 50 having the predetermined height H directly or indirectly contact with the dielectric film 14 (FIG. 5), the air-gap between the discharging electrodes 36 and the dielectric film 14 may be always set at a constant.

Figure 7:
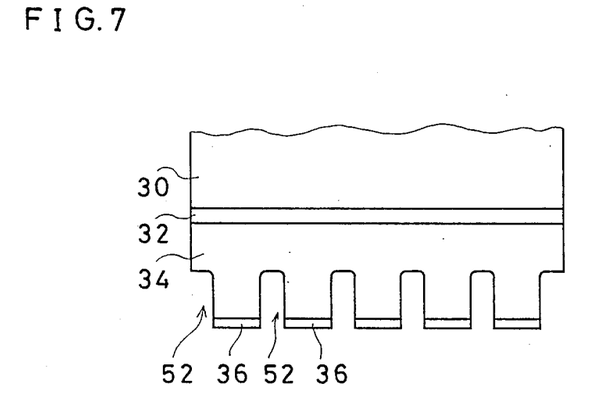
FIG. 7 is an illustrative view showing another embodiment in accordance with the present invention.

In reference to FIG. 7, in the embodiment shown, on the surface of the photoconductive layer 34 facing the dielectric film 14, there are formed recess portions 52 at portions other than the discharging electrodes 36 so that the respective discharging electrodes 36 are isolated in an island-fashion. In accordance with this embodiment, since the surface of the photoconductive layer 34 at the portions other than the discharging electrodes 36 can be largely separated from the dielectric drum 10, an electric current can be concentrated so as to only pass through the discharging electrodes 36. Therefore, discharge takes place at the portions of the discharging electrodes 36 only so that a stable discharge state is obtainable.

Figure 8:
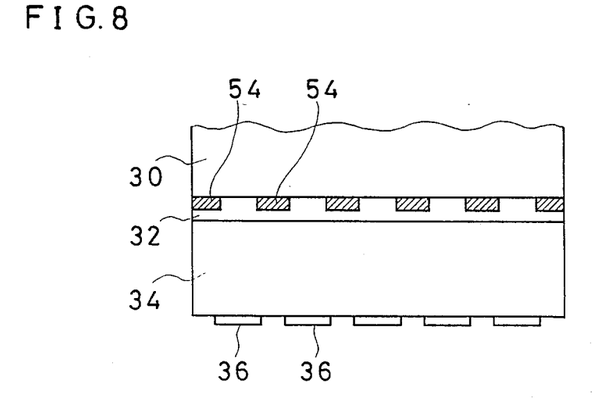
FIG. 8 is an illustrative view showing still another embodiment in accordance with the present invention.

In reference to FIG. 8, in this embodiment shown, opaque members 54 composed of a metallic film such as Cr, Al, Ti, Au, Cu or the like are formed on or within the transparent electrode 32, or on or within the photoconductive layer 34. The opaque members 54 do not obstruct a light path from the LED elements 44 (FIG. 4) to the discharging electrodes 36, but obstruct the light from the LED elements 44 to the portions other than the discharging electrodes 36. By forming such opaque members 54, it is possible to concentrate the light signal from the optical system 38 to the discharging electrodes 36, and therefore malfunction due to leakage or diffusion of the light within the photoconductive layer 34 to the portions other than the discharging electrodes 36 can be prevented.

In addition, in the above-described embodiments, in order to increase the dark resistance and to reduce the dark current, element such as N, C, O or the like may be added in an amorphous silicon constituting the photoconductive layer 34.

Furthermore, in the above-described embodiments, in order to more suitably set a photosensitive peek wavelength of the photoconductive layer 34 in accordance with a wavelength of the light from the LED elements 44 or the other light source, element such as Sn, Ge, S or the like may be added to an amorphous silicon constituting the photoconductive layer 34.

Figure 9:
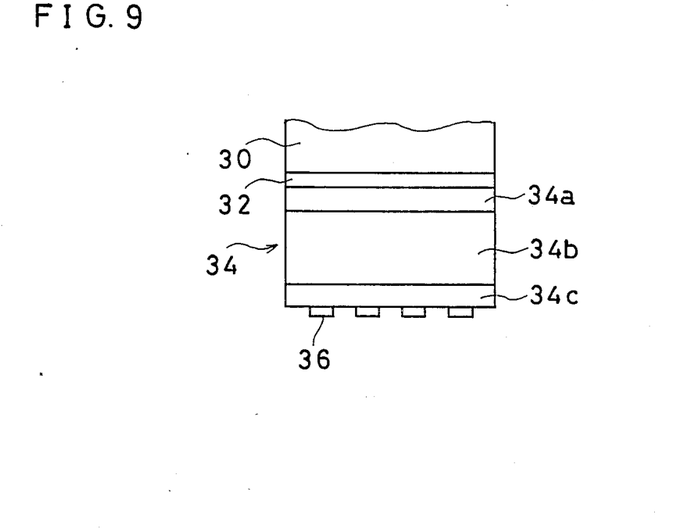
FIG. 9 and FIG. 10 are illustrative views respectively showing different examples of a photoconductive layer.
Figure 10:
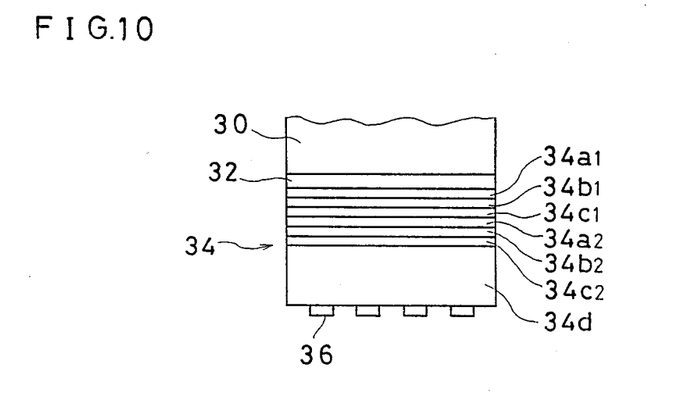

Furthermore, the photoconductive layer 34 may be constituted as a multi-layered member, as shown in FIG. 9 or FIG. 10. In FIG. 9 embodiment, in the photoconductive layer 34, a p-type layer 34a, an i-type layer 34b and an n-type layer 34c are layered in this order. For example, element such as B, Al or the like is doped as a dopant in the p-type layer 34a, and element such as N, P or the like is doped as a dopant in the n-type layer 34c. By forming such a p-i-n structure, it is possible to reduce the dark current and to increase S/N ratio. More specifically, the p-type layer 34 obstructs injection of electron from the transparent electrode 32, and a movement of the electron toward the discharging electrodes 36 is accelerated by the n-type layer 34c.

In FIG. 10 embodiment, two sets of the p-i-n structures as shown in FIG. 9 are formed in the photoconductive layer 34. More specifically, in this embodiment, the photoconductive layer 34 includes a p-type layer 34a1, an i-type layer 34b1, an n-type layer 34c1, a p-type layer 34a2, an i-type layer 34b2, an n-type layer 34c2, and an i-type layer 34d. In accordance with such a layered structure of FIG. 10 embodiment, current injection in the darkened state from the bias voltage source 46 (FIG. 3) to the photoconductive layer 34 can be effectively prevented.

Figure 11:
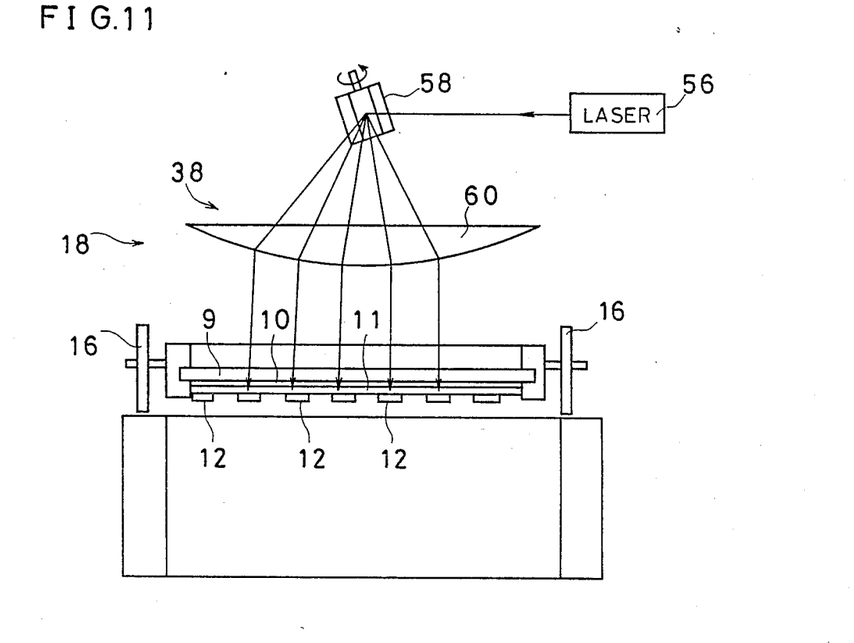
FIG. 11 is an illustrative view showing another embodiment in accordance with the present invention.
Figure 12:
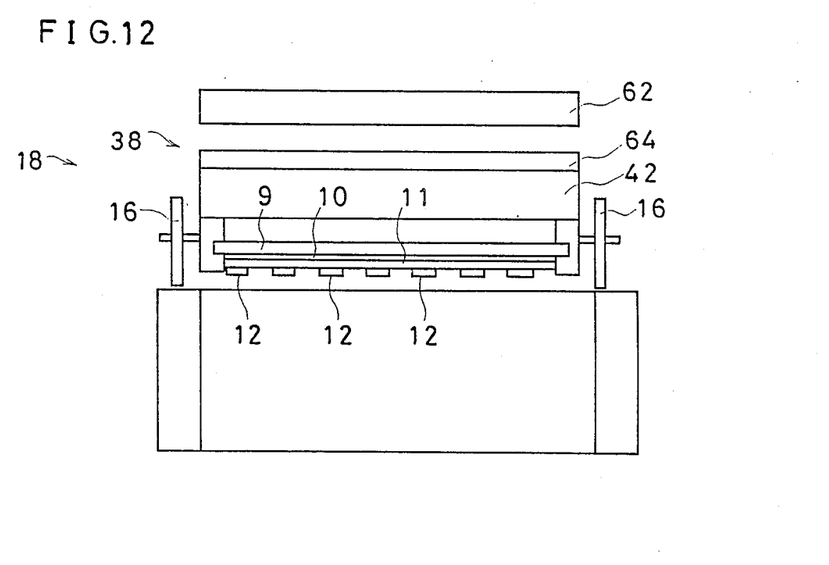
FIG. 12 is an illustrative view showing the other embodiment in accordance with the present invention.

FIG. 11 and FIG. 12 show different examples of the optical system, respectively. In FIG. 11 embodiment, as the optical system 38, instead of a combination of the LED array 40 and the short-focal distance lens array 42 of the previous embodiments, a semiconductor laser 56, a polyon mirror 58 and a focusing lens 60 are utilized. More specifically, the light emitted from the semiconductor laser 56 is scanned by the polygon mirror 58 in accordance with an image signal and impinged to the photoconductive layer 34 through the focusing lens 60.

In FIG. 12 embodiment, the optical system 38 includes a combination of a fluorescent lamp 62, a liquid crystal shutter array 64 and the short-focal distance lens array 42. The light emmited from the fluorescent lamp 62 is partially and selectively transmitted through the liquid crystal shutter array 64 in accordance with an image signal and focused by the short-focal distance lens array 42 and impinged to the photoconductive layer 34.

In addition, in order to implement the best mode of an electrostatic latent image forming apparatus, the aforementioned respective embodiments may be suitably combined with each other.

Furthermore, in the above-described embodiments, the electrostatic latent image is formed on the dielectric film 14 by partially and selectively removing or reducing the electric charges being charged in advance on the dielectric film 14 of the dielectric drum 10 in accordance with the image signal. However, it will be easily understood that the present invention can be applied to an apparatus in which the electrostatic latent image is formed on the dielectric film 14 by partially and selectively supplying or applying the electric charges onto the dielectric film 14 in accordance with the image signal by means of the recording head 18. In this case, the charging corotron 16 (FIG. 1) is not necessary.

In the above, the description was made on the case where the dielectric film 14 is formed on the electrical conductive drum or belt. However, it will be easily understood that the present invention may be equally applied to an apparatus of a so-called direct recording system in which the dielectric film 14 is a recording paper itself.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electrostatic latent image forming apparatus comprising:

a dielectric film;

a recording head for partially and selectively applying electric charges onto said dielectric film in accordance with a light signal or for partially and selectively removing electric charges from said dielectric film in accordance with a light signal, said recording head including a transparent base plate, a transparent electrode on a surface of said transparent base plate facing said dielectric film, a photoconductive layer on said transparent electrode, and discharging electrodes;

an optical system for entering said light signal in accordance with an image signal to said photoconductive layer from a surface of said transparent base plate of said recording head opposing to said dielectric film;

bias means for applying a bias voltage having a predetermined polarity to said transparent electrode, said discharging electrodes being on said photoconductive layer so that an electrostatic capacitance forms between said discharging electrodes and said transparent electrode to thereby prevent an unevenness in density of the electric charges which are discharged between said discharging electrodes and said dielectric film from arising and to thereby concentrate an electric field.

2. An electrostatic latent image forming apparatus in accordance with claim 1, wherein said photoconductive layer includes a non-crystalline semiconductor.

3. An electrostatic latent image forming apparatus in accordance with claim 2, wherein said photoconductive layer includes an amorphous silicon.

4. An electrostatic latent image forming apparatus in accordance with claim 3, wherein the amorphous silicon of said photoconductive layer has a thickness of 0.5 μm through 80 μm.

5. An electrostatic latent image forming apparatus in accordance with claim 3, wherein hydrogen or halogen element of 5 atomic % through 40 atomic % is added to said amorphous silicon.

6. An electrostatic latent image forming apparatus in accordance with claim 3, wherein an element for adjusting a photosensitive peak wavelength is added to said amorphous silicon.

7. An electrostatic latent image forming apparatus in accordance with claim 6, wherein said element includes at least one selected from a group of Sn, Ge and S.

8. An electrostatic latent image forming apparatus in accordance with claim 3, wherein an element for increasing a dark resistance is added to said amorphous silicon.

9. An electrostatic latent image forming apparatus in accordance with claim 8, wherein said element includes at least one selected from a group of N, C and O.

10. An electrostatic latent image forming apparatus in accordance with claim 1, wherein said photoconductive layer includes a plurality of layers respectively having different conductive types.

11. An electrostatic latent image forming apparatus in accordance with claim 10, wherein said photoconductive layer includes a p-i-n structure formed by an p-type layer, an i-type layer and an n-type layer deposited in this order from said transparent electrode side to said dielectric film side.

12. An electrostatic latent image forming apparatus in accordance with claim 1, wherein said photoconductive layer includes a plurality of sets of the p-i-n structures.

13. An electrostatic latent image forming apparatus in accordance with claim 1, wherein said discharging electrodes includes a plurality of dot electrodes formed on said photoconductive layer separately with each other with intervals.

14. An electrostatic latent image forming apparatus in accordance with claim 13, further comprising an insulation covering layer formed on said photoconductive layer between the respective dot electrodes.

15. An electrostatic latent image forming apparatus in accordance with claim 14, wherein said insulation covering layer includes a crystalline insulating material.

16. An electrostatic latent image forming apparatus in accordance with claim 15, wherein said crystalline insulating material includes at least one selected from a group of $Si_3N_4$ and SiC.

17. An electrostatic latent image forming apparatus in accordance with claim 14, wherein said insulation covering layer includes an amorphous insulating material.

18. An electrostatic latent image forming apparatus in accordance with claim 17, wherein said amorphous insulating material includes at least one selected from a group of $a\text{-}Si_xN_{(1-x)}$, a-C and $a\text{-}Si_xC_{(1-x)}$.

19. An electrostatic latent image forming apparatus in accordance with claim 14, wherein said insulation covering layer includes an organic insulating material.

20. An electrostatic latent image forming apparatus in accordance with claim 14, wherein said insulation covering layer has a predetermined film thickness, and an air-gap between said discharging electrodes and said dielectric film is defined by making the tip end of said insulation covering layer directly or indirectly contact with said dielectric film.

21. An electrostatic latent image forming apparatus in accordance with claim 13, further comprising recess portions formed on said photoconductive layer at areas other than said dot electrodes.

22. An electrostatic latent image forming apparatus in accordance with claim 1, further comprising an opaque layer disposed on or in said transparent electrode, or on or in said photoconductive layer for preventing a light of said optical system from being diffused to portions of said photoconductive layer other than said discharging electrodes.

23. An electrostatic latent image forming apparatus in accordance with claim 22, wherein said opaque layer includes a metallic layer.

24. An electrostatic latent image forming apparatus in accordance with claim 1, wherein said optical system includes a combination of an LED array and a short-focal distance lens array.

25. An electrostatic latent image forming apparatus in accordance with claim 1, wherein said optical system includes a combination of a laser element, a polygon mirror and a focusing lens.

26. An electrostatic latent image forming apparatus in accordance with claim 1, wherein said optical system includes a combination of a light source and a liquid crystal shutter array.

27. A recording head for partially and selectively applying electric charges onto a dielectric film in accordance with a light signal or for partially and selectively removing or reducing electric charges from a dielectric film in accordance with a light signal, comprising:

a transparent base plate;

a transparent electrode on a surface of said transparent base plate facing said dielectric film;

a photoconductive layer on said transparent electrode; and discharging electrodes arranged so that a light signal in accordance with an image signal is entered to said photoconductive layer from a surface of said transparent base plate opposing said dielectric film, said discharging electrodes being on said photoconductive layer so that an electrostatic capacitance forms between said discharging electrodes and said transparent electrode to thereby prevent an unevenness in density of the electric charges which are discharged between said discharging electrodes and said dielectric film from arising and to thereby concentrate an electric field.

28. A recording head in accordance with claim 27, further comprising bias means for applying a bias voltage having a predetermined polarity to said transparent electrode.

29. A recording head in accordance with claim 27, wherein said photoconductive layer includes a non-crystalline semiconductor.

30. A recording head in accordance with claim 29, wherein said photoconductive layer includes an amorphous silicon.

31. A recording head in accordance with claim 30, wherein the amorphous silicon of said photoconductive layer has a thickness of 0.5 μm through 80 μm.

32. A recording head in accordance with claim 30, wherein hydrogen or halogen element of 5 atomic % through 40 atomic % is added to said amorphous silicon.

33. A recording head in accordance with claim 30, wherein an element for adjusting a photosensitive peak wavelength is added to said amorphous silicon.

34. A recording head in accordance with claim 33, wherein said element includes at least one selected from a group of Sn, Ge and S.

35. A recording head in accordance with claim 30, wherein an element for increasing a dark resistance is added to said amorphous silicon.

36. A recording head in accordance with claim 35, wherein said element includes at least one selected from a group of N, C and O.

37. A recording head in accordance with claim 27, wherein said photoconductive layer includes a plurality of layers respectively having different conductive types.

38. A recording head in accordance with claim 37, wherein said photoconductive layer includes a p-i-n structure formed by a p-type layer, an i-type layer and an n-type layer deposited in this order from said transparent electrode side to said dielectric film side.

39. A recording head in accordance with claim 38, wherein said photoconductive layer includes a plurality of sets of the p-i-n structures.

40. A recording head in accordance with claim 27, wherein said discharging electrodes includes a plurality of dot electrodes formed on said photoconductive layer separately with each other with intervals.

41. A recording head in accordance with claim 40, further comprising an insulation covering layer formed on said photoconductive layer between the respective dot electrodes.

42. A recording head in accordance with claim 41, wherein said insulation covering layer includes a crystalline insulating material.

43. A recording head in accordance with claim 42, wherein said crystalline insulating material includes at least one selected from a group of $Si_3N_4$ and SiC.

44. A recording head in accordance with claim 41, wherein said insulation covering layer includes an amorphous insulating material.

45. A recording head in accordance with claim 44, wherein said amorphous insulating material includes at least one selected from a group of $a\text{-}Si_xN_{(1-x)}$, a-C and $a\text{-}Si_xC_{(1-x)}$.

46. A recording head in accordance with claim 41, wherein said insulation covering layer includes an organic insulating material.

47. A recording head in accordance with claim 41, wherein said insulation covering layer has a predetermined film thickness, and an air-gap between said discharging electrodes and a dielectric film is defined by making the tip end of said insulating covering layer directly or indirectly contact with said dielectric film.

48. A recording head in accordance with claim 47, further comprising recess portions formed on said photoconductive layer at areas other than said dot electrodes.

49. A recording head in accordance with claim 27, further comprising an opaque layer disposed on or in said transparent electrode, or on or in said photoconductive layer for preventing a light of said optical system from being diffused to portions of said photoconductive layer other than said discharging electrodes.

50. A recording head in accordance with claim 49, wherein said opaque layer includes a metallic layer.

* * * * *